United States Patent
Lee et al.

(10) Patent No.: US 8,144,722 B2
(45) Date of Patent: Mar. 27, 2012

(54) MULTI-CHANNEL SCHEDULING METHOD FOR WLAN DEVICES WITH A SINGLE RADIO INTERFACE

(75) Inventors: Sung-Won Lee, Seoul (KR); Jun-Seo Lee, Seoul (KR); Rakesh Taori, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 805 days.

(21) Appl. No.: 11/432,383

(22) Filed: May 12, 2006

(65) Prior Publication Data

US 2006/0256742 A1 Nov. 16, 2006

Related U.S. Application Data

(60) Provisional application No. 60/680,533, filed on May 13, 2005.

(30) Foreign Application Priority Data

May 3, 2006 (KR) ........................ 10-2006-0040049

(51) Int. Cl.
*H04L 12/40* (2006.01)
(52) U.S. Cl. ..... 370/438; 370/238; 370/252; 370/395.4; 370/461; 370/462; 455/450; 455/452.1; 455/452.2; 455/455; 455/464
(58) Field of Classification Search ................ 370/238, 370/252, 328, 332, 338, 350, 395.4, 428, 370/444, 445, 447, 461, 462, 468, 477
See application file for complete search history.

(56) References Cited

U.S. PATENT DOCUMENTS 6,865,609 B1 * 3/2005 Gubbi et al. .................. 709/230
6,965,942 B1 11/2005 Young et al.
(Continued)

FOREIGN PATENT DOCUMENTS

JP 2003-76368 3/2003
(Continued)

OTHER PUBLICATIONS

Kanghee Kim et al. "A Wireless Multimedia LAN Architecture Using DCF With Shortened Contention Window for QoS Provisioning," Wireless Communications and Networking 2003, WCNC 2003. *2003 IEEE.* pp. 1308-1311; vol. 2; Mar. 16-20, 2003.

(Continued)

*Primary Examiner* — Dwayne Bost
*Assistant Examiner* — Inder Mehra
(74) *Attorney, Agent, or Firm* — NSIP Law

(57) ABSTRACT

A multi-channel scheduling method in a wireless network is provided. The wireless network includes a plurality of Wireless Local Area Network (WLAN) device with a single radio interface. A regular time interval P and a Channel Coordination Window (CCW) to be repeated in a period of P are set. A request is made such that the plurality of devices are tuned to a first channel at a start point of the CCW. A pair of arbitrary WLAN devices among the plurality of WLAN devices is allowed to transmit control frames in the regular time interval P. The control frames are a transmission proposal control frame for proposing communication in a second channel and a response frame, responding to the transmission proposal control frame, for indicating whether the second channel has been accepted or rejected. The arbitrary WLAN device of the pair are switched to the second channel after acceptance.

21 Claims, 4 Drawing Sheets

U.S. PATENT DOCUMENTS

| | | | |
|---|---|---|---|
| 7,224,679 B2 * | 5/2007 | Solomon et al. | 370/338 |
| 7,379,447 B2 * | 5/2008 | Dunagan et al. | 370/350 |
| 2002/0105970 A1 * | 8/2002 | Shvodian | 370/468 |
| 2004/0228281 A1 * | 11/2004 | Rakotoarivelo et al. | 370/252 |
| 2005/0157674 A1 * | 7/2005 | Wentink | 370/328 |
| 2005/0271019 A1 * | 12/2005 | Yuan et al. | 370/338 |

FOREIGN PATENT DOCUMENTS

| | | |
|---|---|---|
| KR | 2006-73151 | 6/2006 |

OTHER PUBLICATIONS

Abdelhamid Nafaa et al. "Sliding Contention Window (SCW); Towards Backoff Range-Based Service Differentiation Over IEEE 802.11 Wireless LAN Networks," *IEEE Network* Jul./Aug. 2005.

Tzu-Jane Tsai et al. "A New MAC Protocol for Wi-Fi Mesh Networks," *Proceedings of the 20th International Conference on Advanced Information Networking and Applications 2006* (AINA '06); pp. 6.; Apr. 18-20, 2006.

* cited by examiner

MULTI-CHANNEL SCHEDULING METHOD FOR WLAN DEVICES WITH A SINGLE RADIO INTERFACE

CROSS-REFERENCE TO RELATED APPLICATIONS

This application claims the benefit under 35 U.S.C. §119 (e) of U.S. Provisional Application No. 60/680,533, filed May 13, 2005, in the United States Patent and Trademark Office, and the benefit under 35 U.S.C. §119(a) of Korean Patent Application No. 2006-40049, filed May 3, 2006, in the Korean Intellectual Property Office, the entire contents of both of which are hereby incorporated by reference.

BACKGROUND OF THE INVENTION

1. Field of the Invention

The present invention relates to a multi-channel scheduling method for Wireless Local Area Network (WLAN) devices with a single radio interface. More particularly, the present invention relates to a multi-channel scheduling method for WLAN devices with a single radio interface in which various settings are freely performed independent of a beacon period.

2. Description of the Related Art

A single radio interface is an independent Institute for Electrical and Electronics Engineers (IEEE) 802.11 wireless device. One wireless device supports a plurality of radio bands, and is regarded as a single radio interface even when it supports only one band once. If multiple radio interfaces are provided in a wireless device, each radio interface is regarded as the single radio interface. A multi-channel operation is an operation of at least one device and is an operation for changing a channel in regular time to efficiently use multiple channels provided from a radio interface in a Wireless Local Area Network (WLAN) device.

Up to now, the WLAN standard has defined a single-channel access scheme. However, a large amount of research has been conducted on a multi-channel access scheme to improve the transmission efficiency of the network. The multi-channel access scheme based on multiple radio interfaces uses one radio interface to transmit and receive a channel control signal, and controls other radio interface channels of the same WLAN. To maximize efficiency, the radio interface for transmitting and receiving control signals is conventionally used only for control signal communication. Because the multi-channel access scheme based on the multiple radio interfaces requires at least two radio interfaces, a multi-channel access scheme based on a single radio interface is required to maintain compatibility at low costs.

A WLAN access control scheme defines a mechanism in which at least two WLAN devices can communicate with each other in one channel. The multi-channel access scheme based on the single radio interface is an access scheme using one channel. Specifically, a channel to be commonly used between all devices is referred to as a "common channel."

When the common channel has been changed to a different channel for multi-channel operation in WLAN devices with a single radio interface, a state of the common channel can be no longer detected. The WLAN device cannot communicate with an arbitrary WLAN device on the common channel. This will be briefly described with reference to FIG. 1.

FIG. 1 schematically illustrates a problem occurring in WLAN devices with a conventional single radio interface.

Referring to FIG. 1, a Mesh Point (MP) can directly communicate with other MPs. While MP1, MP2, MP3, MP4, MP5, and MP6 use Channel 1 (CH1) as a common channel, MP1 and MP2 make a channel change to Channel 2 (CH2) and then communicate with each other. Simultaneously, MP5 and MP6 make a channel change to Channel 3 (CH3) and then communicate with each other. When the channels do not interfere with each other, the operation improves the transmission efficiency of the overall network. In this case, MP3 and MP4 cannot communicate with an MP operating on a different channel during a predetermined time interval. The MP operating on the different channel does not know the state of the common channel.

In WLAN devices with a single radio interface, a multi-channel access scheme uses an existing beacon period. This scheme uses a specific interval (or Ad hoc Traffic Indication Message (ATIM) window) for a low power operating mode provided in the WLAN standard. This interval is repeated in the beacon period. Only a particular control frame transmission is allowed in the interval. During the interval, the WLAN device makes a channel change to a common channel. A control frame containing channel change information is exchanged, and other types of frames are not transmitted. Before the next beacon period subsequent to the above-described interval starts, a channel is changed and then data is transmitted and received.

Using the beacon period, the conventional method has three problems. First, an unintended function is included due to the beacon period. The unintended function may be an example of timer synchronization within the WLAN. Accordingly, it is undesirable for that the beacon period to be used to enable multi-channel operation. The beacon period is a relatively long time. When traffic to be communicated to a WLAN device on the same channel is insufficient during this time, radio resource waste and an unnecessary delay time may occur. Second, a multi-hop environment, such as recent mesh networking, is not supported because the beacon period has been designed for a single-hop environment in which all WLAN devices can communicate with each other. Third, when an MP supports communication with a station (STA) through an Access Point (AP) function, synchronization based on the beacon period with other MPs is not allowed because of beacon collision.

Thus, a need exists for a method capable of supporting multi-hop communication without use of a beacon and that effectively supports a Basic Service Set (BSS) between an AP and an STA and Wireless Distribution System (WDS) traffic between MPs.

SUMMARY OF THE INVENTION

It is, therefore, an object of exemplary embodiments of the present invention to provide a multi-channel scheduling method that can enable communication between arbitrary Mesh Points (MPs) operating on multiple channels in relation to a node with a single radio interface, multiplex a Basic Service Set (BSS) and Wireless Distribution System (WDS) traffic, and optimize multicast/broadcast.

It is another object of exemplary embodiments of the present invention to provide a multi-channel scheduling method that can solve problems occurring in conventional methods using an existing beacon period and enable various settings for a multi-channel operation while avoiding overload in Wireless Local Area Network (WLAN) devices with a single radio interface.

In accordance with an aspect of exemplary embodiments of the present invention, there is provided a multi-channel scheduling method in a wireless network comprising a plurality of Wireless Local Area Network (WLAN) devices with a single radio interface. The method comprises setting a regular time interval P and a Channel Coordination Window (CCW) to be repeated in a period of P, making a request such that the plurality of WLAN devices are tuned to a first channel at a start point of the CCW, and allowing a pair of arbitrary WLAN devices among the plurality of WLAN devices to transmit control frames in the regular time interval P, wherein the control frames comprise a transmission proposal control frame for proposing communication in a second channel and a response frame responding to the transmission proposal control frame for indicating whether the second channel has been accepted or rejected, and the arbitrary devices of the pair are switched to the second channel after acceptance in response to the transmission proposal control frame.

In accordance with another aspect of exemplary embodiments of the present invention, there is provided a multi-channel scheduling method in a wireless network comprising a plurality of Wireless Local Area Network (WLAN) devices with a single radio interface. The method comprises setting a regular time interval P and a Channel Coordination Window (CCW) to be repeated in a period of P, making a request such that the plurality of WLAN devices are tuned to a preset channel at a start point of the CCW, and allowing all arbitrary Access Points (APs) to be switched to a Basic Service Set (BSS) channel at an end point of the CCW, wherein the APs are central coordinators of the BSS.

In accordance with yet another aspect of exemplary embodiments of the present invention, there is provided a multi-channel scheduling method in a wireless network comprising a plurality of Wireless Local Area Network (WLAN) devices with a single radio interface. The method comprises setting a regular time interval P and a Channel Coordination Window (CCW) to be repeated in a period of P, making a request such that the plurality of WLAN devices are tuned to a preset channel at a start point of the CCW, and allowing a cluster of arbitrary WLAN devices among the plurality of WLAN devices to transmit management frames in a CCW interval, wherein the management frames comprise a transmission frame for proposing a frequency channel and a response frame for making an agreement to join the proposed channel, and the arbitrary WLAN devices of the cluster are switched to the proposed channel after an end point of the CCW.

BRIEF DESCRIPTION OF THE DRAWINGS

The above and other objects and exemplary aspects of the present invention will become more apparent from the following detailed description of certain exemplary embodiments taken in conjunction with the accompanying drawings, in which.

Throughout the drawings, like reference numbers should be understood to refer to like elements, features, and structures.

DETAILED DESCRIPTION OF EXEMPLARY EMBODIMENTS

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Descriptions of well-known functions and constructions are omitted for clarity and conciseness.

Figure 1:
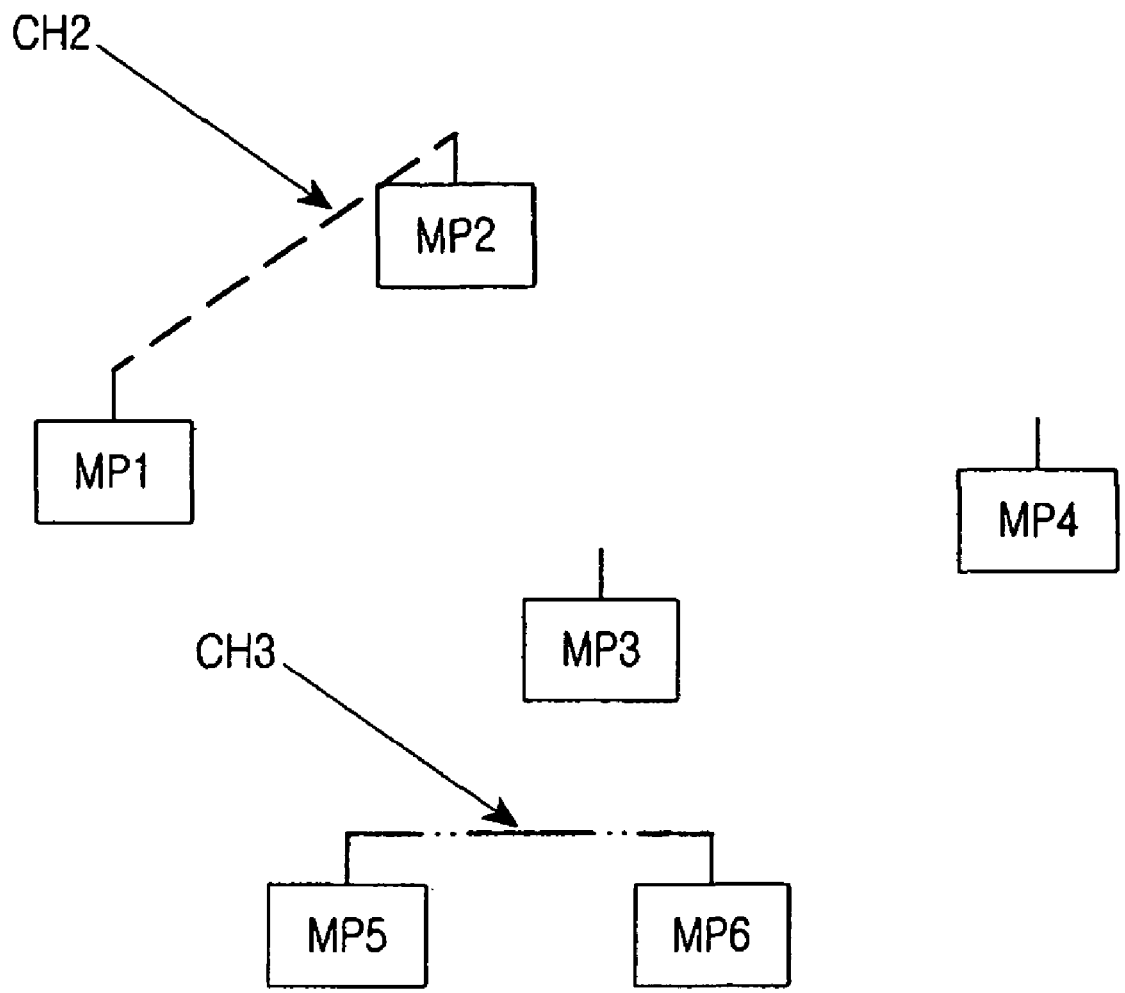
FIG. 1 schematically illustrates a problem occurring in Wireless Local Area Network (WLAN) devices with a conventional single radio interface.
Figure 2:
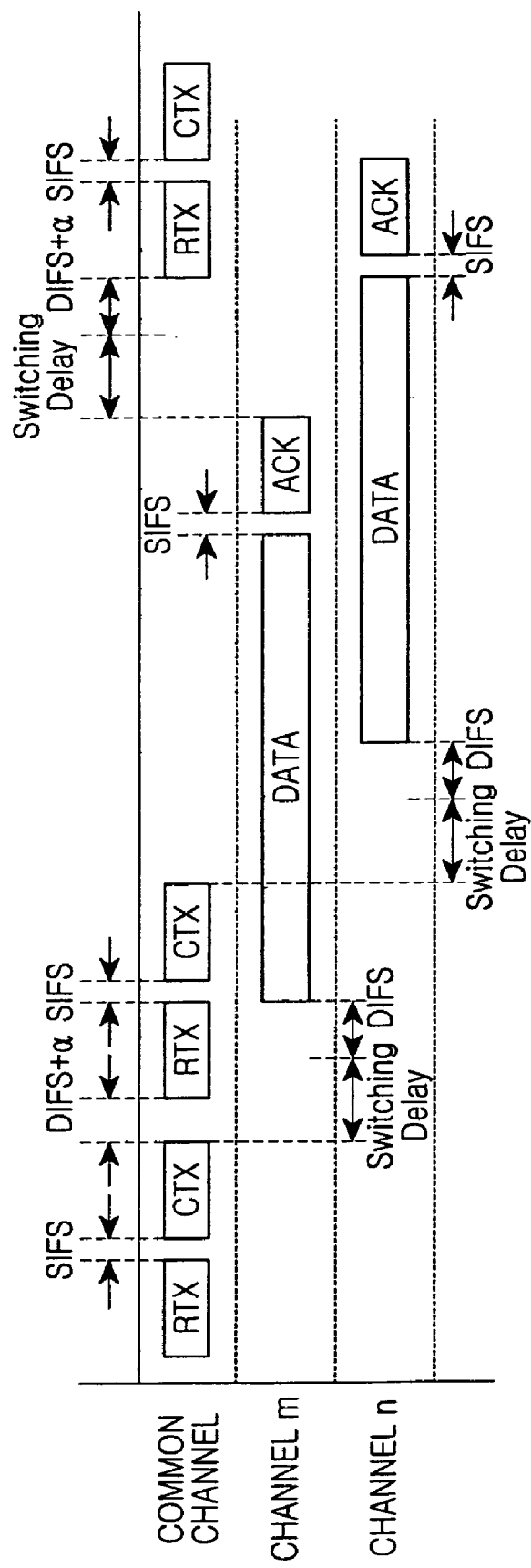
FIG. 2 schematically illustrates dynamic channel selection on a common channel in accordance with an exemplary embodiment of the present invention.

FIG. 2 schematically illustrates dynamic channel selection on a common channel in accordance with an exemplary embodiment of the present invention.

Referring to FIG. 2, a Mesh Point (MP) capable of communicating with other MPs can exploit a common channel to select an available channel. This is the core of a dynamic channel selection scheme. Information about a target channel m is exchanged in the common channel using Request To Switch (RTX) and Clear To Switch (CTX) frames with a Short Interframe Space (SIFS) subsequent to a data frame transmission on the target channel m. The RTX and CTX frames are used to request and release channel switching. When data frame transmission is performed on the channel m after a switching delay and a Distributed Coordination Function (DCF) Interframe Space (DIFS) subsequent to the exchange process, other transmissions can be initialized on a different target channel n. The above-described dynamic channel selection will be described in detail with reference to the exemplary embodiment illustrated in FIG. 3.

Figure 3:
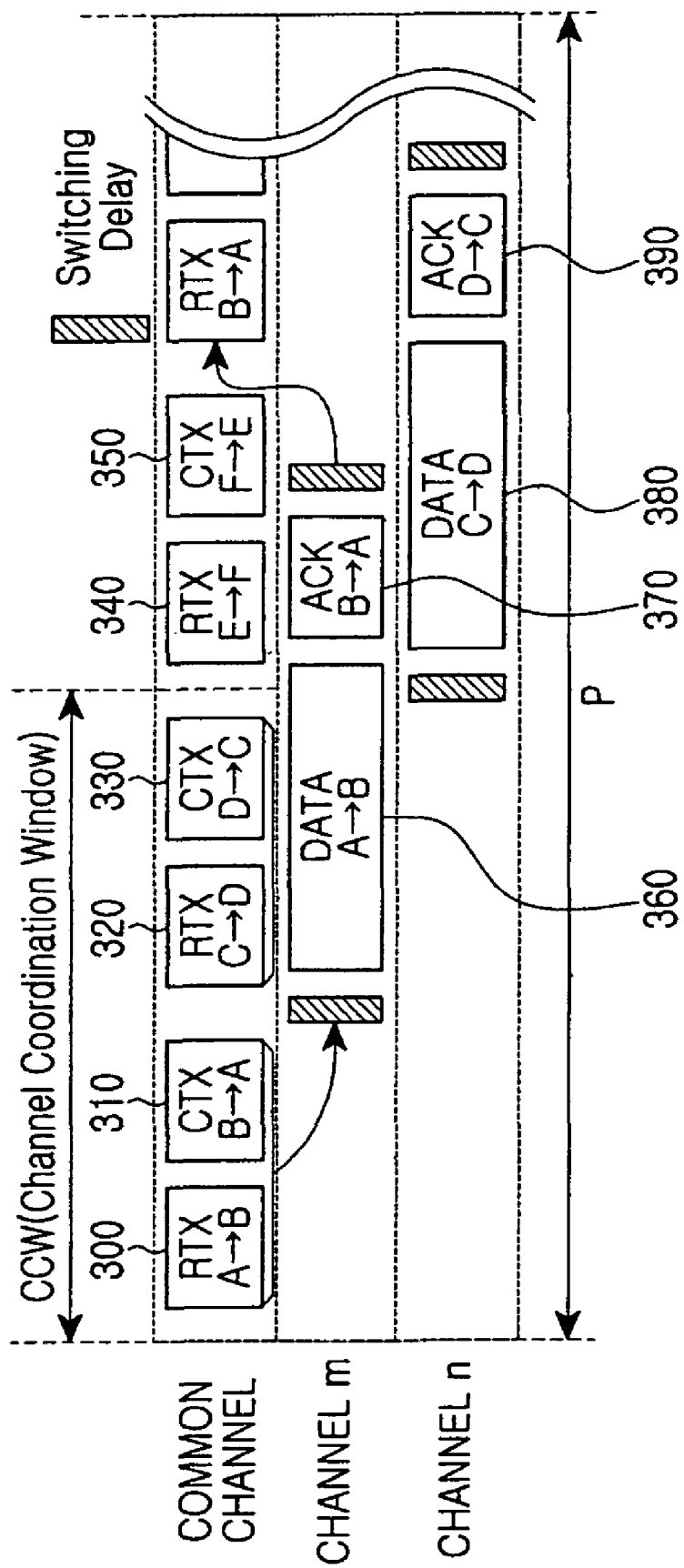
FIG. 3 illustrates a scheduling method for supporting a multi-channel operation in WLAN devices with a single radio interface in accordance with an exemplary embodiment of the present invention.

FIG. 3 illustrates a scheduling method for supporting a multi-channel operation in WLAN devices with a single radio interface in accordance with an exemplary embodiment of the present invention.

Referring to FIG. 3, a common channel scheduling method is applied to a WLAN device with the single radio interface such that a multi-channel merit can be taken. Conventionally, an MP with the single radio interface on a common channel cannot communicate with MPs on other channels. Also, MPs with the single radio interface on other channels cannot know a state of a network on the common channel and vice versa. To overcome these drawbacks, a concept of a window continuous during a regular time P is proposed.

An arbitrary multi-channel operation is started and ended in a window P. All WLAN MPs use a common channel at the start time of P. The MPs have an opportunity for communication with each other in every period of at least P. To optimize the multi-channel efficiency, the multiplex of a Basic Service Set (BSS) and Wireless Distribution System (WDS) traffic, or the multicast/broadcast, a time from the beginning of the window P is designated and exploited as a Channel Coordination Window (CCW). The duration of the CCW corresponds to part of the window P.

Next, the multi-channel operation will be described with reference to an example of FIG. 3. During the CCW interval, an RTX frame is transmitted from an arbitrary MP A to an arbitrary MP B of a pair of MPs A and B, and a CTX frame is transmitted from the MP B to the MP A, as indicated by reference numerals 300 and 310. Subsequently, a data frame 360 and an acknowledgement (ACK) frame 370 are transmitted on a channel m, and the MPs A and B of the pair can perform an inverse process. Similarly, an RTX frame is transmitted from an arbitrary MP C to an arbitrary MP D of a pair of MPs C and D, and a CTX frame is transmitted from the MP D to the MP C, as indicated by reference numerals 320 and 330. Subsequently, a data frame 380 and an ACK frame 390 are transmitted on a channel m, and the MPs C and D of the pair can perform an inverse process. In a non-CCW interval, a data frame and an ACK frame can be transmitted on the common channel as indicated by reference numerals 340 and 350.

Figure 4:
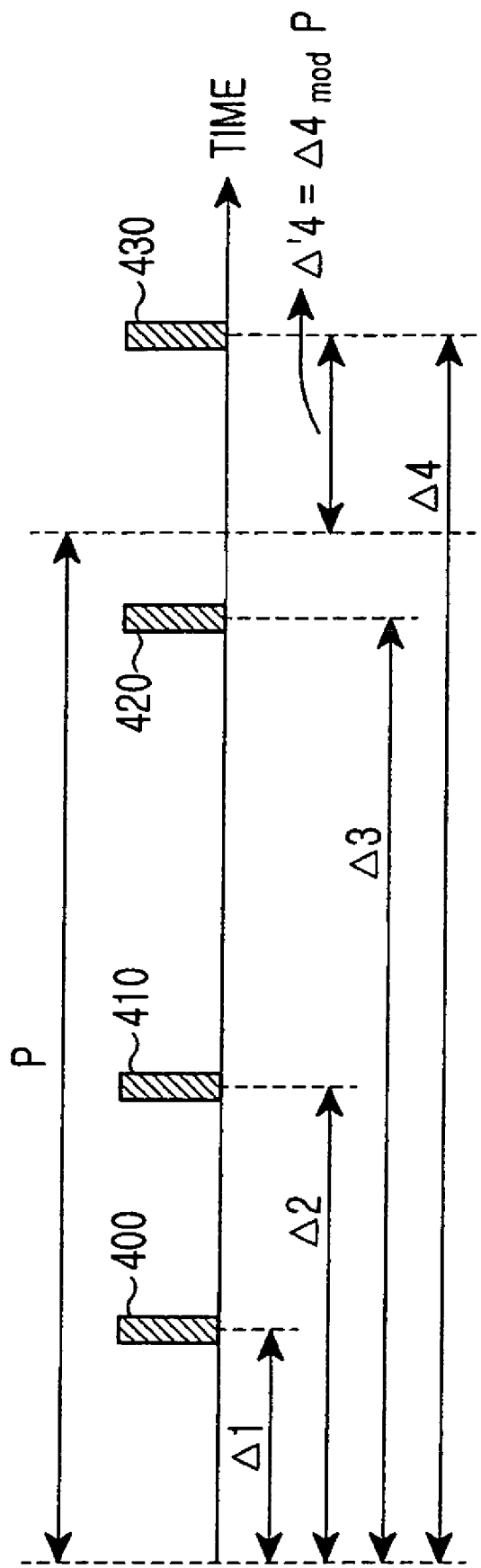
FIG. 4 illustrates a method for setting a window P value and a CCW value corresponding to common channel scheduling parameters in accordance with an exemplary embodiment of the present invention.

FIG. 4 illustrates a method for setting a window P value and a CCW value corresponding to common channel scheduling parameters in accordance with an exemplary embodiment of the present invention.

Referring to FIG. 4, an MP starts to scan beacons 400, 410, 420, and 430 through an association process of the conventional WLAN. If a beacon is not scanned, the MP transmits a beacon with its own window P and CCW values. The window P and CCW values are carried and transmitted in a WLAN information element of a beacon. When each MP transmits the beacon, an offset ($\Delta$) is transmitted along with the window P and CCW values. The offset is an elapsed time after the start of the current window P, and corresponds to the remainder computed by dividing a hardware timer value by P without synchronization based on the hardware timer value. Upon receiving the beacon, the MP performs an update process when new window P and CCW values are different from the current values, and computes its own offset as shown in Equation (1).

$$\text{New Offset } (\Delta_{new}) = (\text{Received Offset } (\Delta_{rcvd}) + \text{Hardware Timer Value}) \text{ modulo } P \quad \text{Equation (1)}$$

Because MPs can copy window P and CCW values from other MPs, the update process is easily performed. Optimal window P and CCW values can be varied according to a request of a topology or application. Because the number of beacons to be transmitted is not affected even though a small window P value is set in a common channel scheduling method of exemplary embodiments of the present invention, overhead can be avoided when a beacon period itself is shortened.

When a beacon is not used in a multi-hop WLAN system or a beacon is not received, common channel scheduling parameters of exemplary embodiments of the present invention can be transferred to other WLAN devices using a probe request frame and a probe response frame. Because the probe request frame can use a WLAN information element of a beacon frame without a change, window P and CCW values and an offset can be updated and computed using the above-described method. The probe response frame has only a function for responding to the probe request frame.

As is apparent from the above description, exemplary embodiments of the present invention have the following exemplary effects.

A multi-channel scheduling method according to exemplary embodiments of the present invention can enable communication between arbitrary MPs operating on multiple channels in relation to a node with a single radio interface, multiplex a BSS and WDS traffic, and optimize multicast/broadcast.

Moreover, exemplary implementations of the present invention can address problems occurring in the conventional methods using an existing beacon period and enable various settings for a multi-channel operation while avoiding overload in WLAN devices with a single radio interface.

While the present invention has been particularly shown and described with reference to certain exemplary embodiments thereof, it will be understood by those of ordinary skill in the art that various changes in form and detail may be made therein without departing from the spirit and scope of the present invention as defined by the appended claims and equivalents thereof.

What is claimed is:

1. A multi-channel scheduling method in a wireless network comprising a plurality of Wireless Local Area Network (WLAN) devices with a single radio interface, the method comprising:
    setting a time interval of duration P and a Channel Coordination Window (CCW) to be repeated in a period of the duration P;
    switching from present channels of the plurality of WLAN devices to a first channel at a start point of the CCW; and
    allowing a pair of arbitrary WLAN devices among the plurality of WLAN devices to transmit control frames in the time interval of the CCW,
    wherein the control frames comprise a transmission proposal control frame for proposing communication in a second channel and a response frame, responding to the transmission proposal control frame for indicating whether the second channel has been accepted or rejected, and wherein the pair of arbitrary WLAN devices are switched to the second channel after acceptance in response to the transmission proposal control frame, and
    wherein the pair of arbitrary WLAN devices return from the second channel to the first channel upon completion of a transmission of a data frame corresponding to the control frames and an acknowledgement (ACK) frame for the data frame.

2. The multi-channel scheduling method of claim 1, wherein the plurality of WLAN devices of the wireless network other than the pair of arbitrary WLAN devices continuously perform transmission and reception on the first channel.

3. The multi-channel scheduling method of claim 1, wherein the plurality of WLAN devices are allowed to exchange valid Media Access Control (MAC) frames on the first channel.

4. The multi-channel scheduling method of claim 1, wherein P and CCW values are transmitted using a beacon frame.

5. The multi-channel scheduling method of claim 4, wherein the beacon frame comprises an offset.

6. The multi-channel scheduling method of claim 5, wherein the offset comprises an elapsed time after P and is expressed as a modulo value.

7. The multi-channel scheduling method of claim 1, wherein P and CCW values are dynamically changed according to different data scenarios.

8. A multi-channel scheduling method in a wireless network comprising a plurality of Wireless Local Area Network (WLAN) devices with a single radio interface, the method comprising:
    setting a time interval of duration P and a Channel Coordination Window (CCW) to be repeated in a period of the duration P;
    switching from present channels of the plurality of WLAN devices to a first channel at a start point of the CCW;
    allowing a pair of arbitrary WLAN devices among the plurality of WLAN devices to transmit control frames in the time interval of the CCW; and
    allowing arbitrary Access Points (APs) to be switched to a Basic Service Set (BSS) channel at an end point of the CCW, wherein the control frames comprise a transmission proposal control frame for proposing communication in a second channel, and a response frame for responding to the transmission proposal control frame and for indicating whether the second channel has been accepted or rejected, wherein the pair of arbitrary WLAN devices are switched to the second channel after acceptance in response to the transmission proposal control frame, and wherein the pair of arbitrary WLAN devices return from the second channel to the first channel upon completion of a transmission of a data frame corresponding to the control frames and an acknowledgement (ACK) frame for the data frame, and wherein the APs comprise central coordinators of the BSS.

9. The multi-channel scheduling method of claim 8, wherein the plurality of WLAN devices of the wireless network other than the pair of arbitrary WLAN devices continuously perform transmission and reception on the first channel.

10. The multi-channel scheduling method of claim 8, wherein the plurality of WLAN devices are allowed to exchange valid Media Access Control (MAC) frames on the first channel.

11. The multi-channel scheduling method of claim 8, wherein P and CCW values are transmitted using a beacon frame.

12. The multi-channel scheduling method of claim 11, wherein the beacon frame comprises an offset.

13. The multi-channel scheduling method of claim 12, wherein the offset comprises an elapsed time after P and is expressed as a modulo value.

14. The multi-channel scheduling method of claim 8, wherein P and CCW values are dynamically changed according to different data scenarios.

15. A multi-channel scheduling method in a wireless network comprising a plurality of Wireless Local Area Network (WLAN) devices with a single radio interface, the method comprising:

setting a time interval of duration P and a Channel Coordination Window (CCW) to be repeated in a period of the duration P;

switching from present channels of the plurality of WLAN devices to a first channel at a start point of the CCW; and allowing a cluster of arbitrary WLAN devices among the plurality of WLAN devices to transmit management frames in the time interval of the CCW, wherein the management frames comprise a transmission frame for proposing a frequency channel and a response frame for making an agreement to join the proposed channel, and wherein the cluster of arbitrary WLAN devices are switched to the proposed channel after an end point of the CCW, and wherein the cluster of arbitrary WLAN devices return from the proposed channel to the first channel upon completion of a transmission of a data frame corresponding to the management frames and an acknowledgement (ACK) frame for the data frame.

16. The multi-channel scheduling method of claim 15, wherein the WLAN devices of the wireless network other than the cluster of arbitrary WLAN devices continuously perform transmission and reception on the first channel.

17. The multi-channel scheduling method of claim 15, wherein the plurality of WLAN devices are allowed to exchange valid Media Access Control (MAC) frames on the first channel.

18. The multi-channel scheduling method of claim 15, wherein P and CCW values are transmitted using a beacon frame.

19. The multi-channel scheduling method of claim 18, wherein the beacon frame comprises an offset.

20. The multi-channel scheduling method of claim 19, wherein the offset comprises an elapsed time after P and is expressed as a modulo value.

21. The multi-channel scheduling method of claim 15, wherein P and CCW values are dynamically changed according to different data scenarios.

* * * * *